July 25, 1933.  E. E. HEWITT  1,919,431
CONTROL VALVE FOR RETAINING VALVES
Filed Oct. 27, 1930
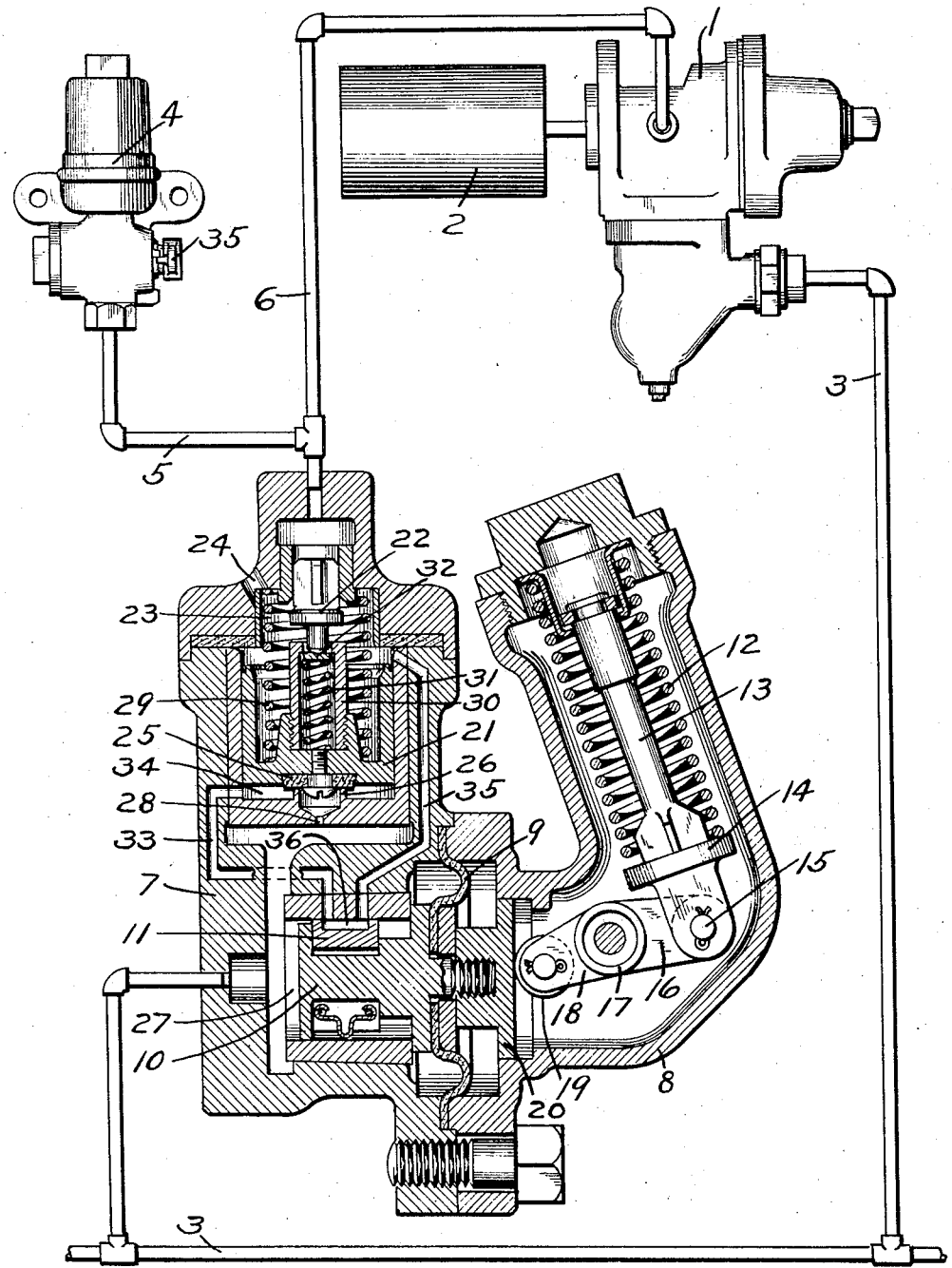
INVENTOR.
ELLIS E. HEWITT
BY *Wm. M. Cady*
ATTORNEY.

Patented July 25, 1933

1,919,431

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

CONTROL VALVE FOR RETAINING VALVES

Application filed October 27, 1930. Serial No. 491,334.

This invention relates to fluid pressure brakes, and more particularly to means for controlling the retaining of pressure in the brake cylinder in the operation of releasing the brakes.

In the running of railway trains, when descending grades, it is desirable to retain a certain degree of fluid pressure in the brake cylinder, when the brake pipe pressure is increased to recharge the auxiliary reservoirs throughout the train.

The principal object of my invention is to provide an improved, automatically operated means for cutting the retaining means into action when operating on grades and for cutting the retaining means out of action when operating on a level road.

In the accompanying drawing, the single figure is a diagrammatic view of a fluid pressure brake equipment, showing my invention embodied therein.

In the drawing is shown a fluid pressure brake equipment comprising the usual triple valve device 1, auxiliary reservoir 2, brake pipe 3, and a retaining valve device 4, which is connected through pipe 5 with a pipe 6, leading to the usual exhaust port of the triple valve device 1.

The controlling valve device comprises a casing 7 and a casing 8 which is secured to casing 7. Clamped between said casings is a flexible diaphragm 9 and secured to said diaphragm is a stem 10 for operating a slide valve 11.

In the casing 8 is mounted a coil spring 12, and within said spring is disposed a movable plunger 13 having a collar 14 against which one end of said spring engages. One end of the plunger 13 is pivotally connected, through a pin 15, with an arm 16 of a lever 17, the other arm 18 of the lever carrying a roller 19, adapted to engage the face of a disc 20. Said disc is guided in an annular recess provided in the casing 8 and is secured to the diaphragm 9.

Mounted in the casing 7 is a valve piston 21 for controlling the operation of a valve 22. The valve 22 controls communication from the triple valve exhaust pipe 6 to chamber 23 which is open to the atmosphere, through a port 24. The valve piston 21 is provided with a valve seat 25 at its lower end, which is adapted to engage an annular seat rib 26, and the area within the seat rib 26 is open to valve chamber 27 through a restricted port 28. The valve piston 21 is urged to seat on the seat rib 26 by a coil spring 29.

Secured centrally of the valve piston 21 is a sleeve 30 in which is mounted a coil spring 31 and said spring acts through a spring follower 32 to operate the valve 22. This permits of a relative movement between the valve piston 21 and the valve 22, so that the seating of valve 22 is always assured, when the valve piston 21 seats at its upper seat.

A passage 33 leads from chamber 34, below the valve piston 21 to the seat of slide valve 11, and a passage 35 leads from chamber 23 to the seat of said slide valve, said passages being connected through a cavity 36 in slide valve 11, when said slide valve is in the position shown in the drawing.

In operation, when the brake pipe 3 is charged with fluid under pressure in the usual manner, fluid at brake pipe pressure is present in valve chamber 27 and acts on one side of the diaphragm 9.

The spring 12 acts through lever 17 to oppose movement of diaphragm 9 to the right by brake pipe pressure in valve chamber 27, and spring 12 is of such resistance and the parts are so positioned, that when the brake pipe pressure does not exceed the normal standard pressure carried in the brake pipe for level road service, the fluid pressure will not be sufficient to overcome the opposing force of the spring 12.

The slide valve 11 therefore is held in the position shown in the drawing, in which chamber 34 is connected to exhaust port 24, through passage 33, cavity 36 in slide valve 11, passage 35, and chamber 23. The area of the valve piston 21 outside of the seat rib 26 being at atmospheric pressure, the valve piston 21 is held with the seat 25 engaging seat rib 26, by the spring 29.

The valve 22 is thus allowed to remain open, so that the triple valve exhaust pipe 6 is open to the atmospheric exhaust port 24, and fluid under pressure is not retained in the brake cylinder by operation of the retaining valve device 4, when the brakes are released after an application of the brakes.

It will be understood that where the automatic retainer controlling valve device is employed, the handle 35 of the retainer 4 is set to the position for retaining fluid under pressure in the brake cylinder.

When it is desired to retain pressure in the brake cylinder as in grade service, by operation of the retaining valve device 4, the brake pipe pressure is raised above the normal pressure carried in level road service.

When the brake pipe pressure is raised a predetermined degree above the normal, the pressure of spring 12 is overcome, and diaphragm 9 starts movement toward the right, causing the lever 17 to be rotated in a counterclockwise direction. The angular position of arm 18 is thus changed, so that the component of the force with which the diaphragm 9 presses against the roller 19 and which acts to oppose the pressure of spring 12 increases, and consequently the rate of movement of the diaphragm increases, causing a snap-like action of the diaphragm, after the diaphragm once starts to move to the right.

When the diaphragm 9 is in its right hand position, the slide valve 11 is moved so that passage 33 is uncovered, permitting fluid under pressure from the brake pipe to flow to the chamber 34. The valve piston 21 is thereupon shifted to its upper seat. The valve 22 is thus shifted, by the movement of the valve piston 21, to its closed position, in which the direct atmospheric exhaust port 24 is cut off from the triple valve exhaust pipe 6. It will now be seen that with the valve 22 closed, in releasing the brakes, pressure is retained in the brake cylinder, according to the setting of the retaining valve device 4.

When the brake pipe pressure is reduced to normal, the diaphragm 9 and slide valve 11 will be returned to the position shown in the drawing, but the valve piston 21 will remain in its upper position, since the full area of the valve piston is now exposed to brake pipe pressure, and since the resistance of the spring 29 is such that the normal brake pipe pressure acting in chamber 34 will exceed the pressure of the spring.

In order to effect the movement of the valve piston 21 to its inner seat, when it is desired to operate the train with the retaining valve devices cut out, the brake pipe pressure must be reduced below the equalizing point. When so reduced, the pressure of spring 29 will overcome the reduced brake pipe pressure and the valve piston 21 will be shifted to its lower seated position, permitting the valve 22 to unseat. The brake pipe pressure may now be increased to normal without causing any movement of the controlling valve device parts, since the chamber 34 is now open to the atmosphere by way of passage 33, cavity 36, passage 35, and exhaust port 24.

A restricted port 28 is provided, so that when the valve piston 21 is moved downwardly from its upper seat, opening communication from passage 35 to exhaust port 24, the pressure cannot build up in chamber 34 by flow from the brake pipe through port 28, faster than it can escape by flow through passage 35 to the atmosphere.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, brake pipe, and a triple valve device, of valve means for controlling communication from the brake cylinder exhaust port of the triple valve device to an atmospheric exhaust port and having a limited area normally exposed to fluid pressure and operated by fluid pressure supplied to the unexposed area for closing said communication, and a valve device operated by an increase in brake pipe pressure above a predetermined degree for supplying fluid under pressure to the normally unexposed area of said valve means.

2. In a fluid pressure brake, the combination with a brake cylinder, brake pipe, and a triple valve device, of valve means operated by a variation in fluid pressure for cutting off communication from the brake cylinder exhaust port of the triple valve device to an atmospheric exhaust port, a valve for controlling variations in fluid pressure on said valve means, a movable abutment subject on one side to brake pipe pressure for operating said valve, a lever rotatable by the movement of said abutment, and a spring for opposing rotation of said lever.

3. In a fluid pressure brake, the combination with a brake cylinder, brake pipe, and a triple valve device, of valve means operated by a variation in fluid pressure for cutting off communication from the brake cylinder exhaust port of the triple valve device to an atmospheric exhaust port, a valve for controlling variations in fluid pressure on said valve means, a movable abutment subject on one side to brake pipe pressure for operating said valve, a lever rotatable by the movement of said abutment upon movement on said abutment by an increase in brake pipe pressure, and a spring for opposing rotation of said lever.

4. In a fluid pressure brake, the combination with a brake cylinder, brake pipe, and a triple valve device, of valve means operated by a variation in fluid pressure for cutting off communication from the brake cylinder exhaust port of the triple valve device to an atmospheric exhaust port, a valve for controlling variations in fluid pressure on said valve means, a movable abutment subject on one side to brake pipe pressure for operating said valve, a lever rotatable by the movement of said abutment upon movement in said abutment by an increase in brake pipe pressure, and a spring for opposing rotation of said lever, said lever being so positioned that the rotation of the lever reduces the force of the spring opposing the movement of the abutment.

ELLIS E. HEWITT.